United States Patent [19]
Born et al.

[11] 3,947,549
[45] Mar. 30, 1976

[54] PREPARATION OF INDIUM PHOSPHIDE

[75] Inventors: Peter Jeremy Born, Ledbury; Daniel Stewart Robertson, Malvern, both of England

[73] Assignee: British Secretary of State for Defence, London, England

[22] Filed: Mar. 12, 1974

[21] Appl. No.: 450,507

[30] Foreign Application Priority Data

Mar. 15, 1973  United Kingdom............... 12934/73

[52] U.S. Cl. .............................. 423/299; 75/134 T
[51] Int. Cl.$^2$......................................... C01B 25/00
[58] Field of Search............ 423/299; 75/134 T, 149

[56] References Cited
UNITED STATES PATENTS

| | | | |
|---|---|---|---|
| 3,094,388 | 6/1963 | Johnson et al...................... | 423/299 |
| 3,617,371 | 11/1971 | Burmeister.......................... | 423/299 |

*Primary Examiner*—Oscar R. Vertiz
*Assistant Examiner*—Gregory A. Heller
*Attorney, Agent, or Firm*—Elliott I. Pollock

[57]     ABSTRACT

A method of preparing III-V material which is or contains one of the compounds aluminum nitride, indium nitride, indium phosphide, gallium phosphide and gallium nitride involves directing a controlled gaseous flow of a hydride of nitrogen or phosphorus as appropriate, preferably ammonia or phosphine, into the vapour of a halide, preferably a chloride, of aluminum, indium or gallium as appropriate at a temperature below the decomposition temperature of the appropriate III-V material and collecting the III-V material formed by the reaction of the hydride and the halide.

10 Claims, 1 Drawing Figure

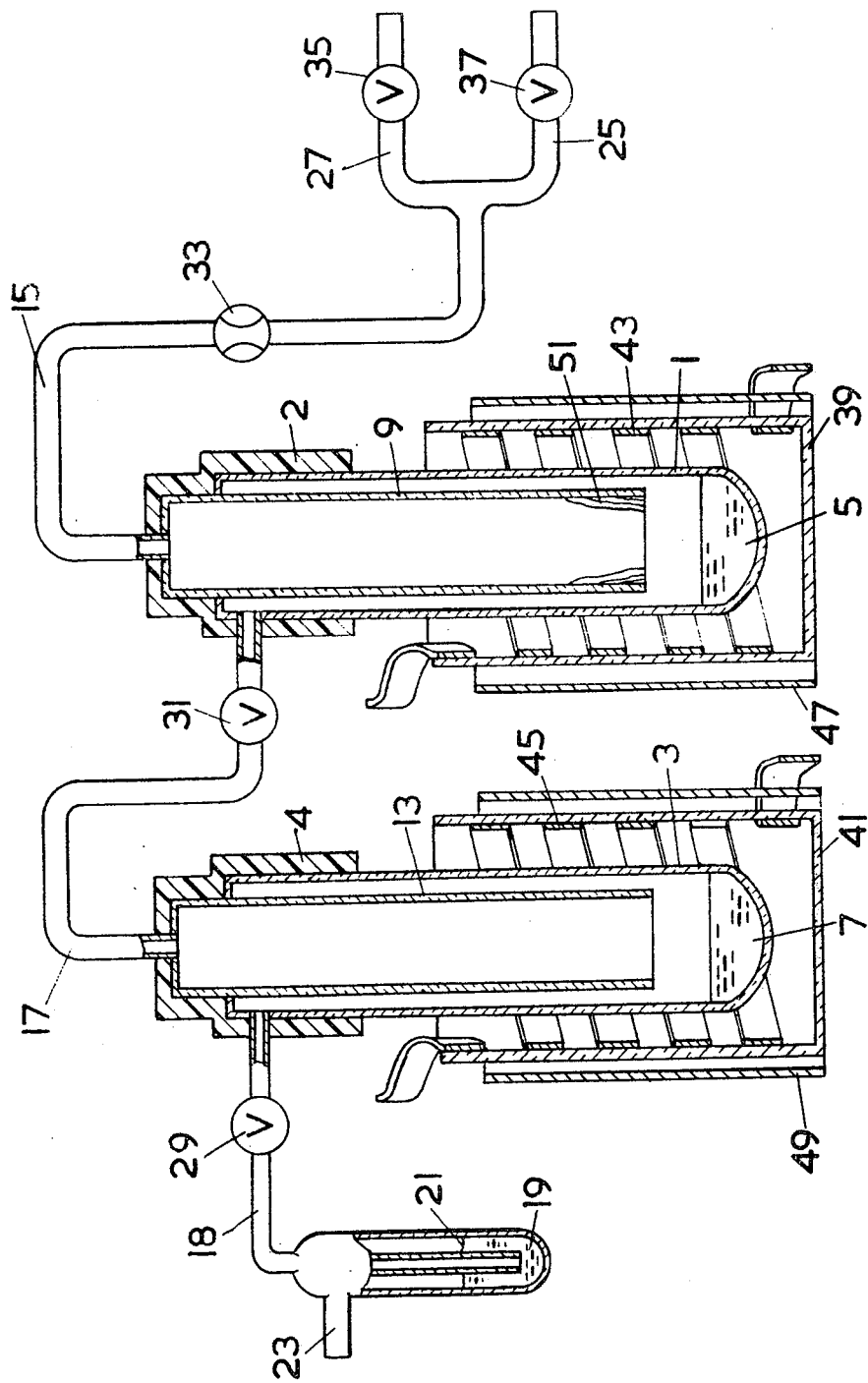

PREPARATION OF INDIUM PHOSPHIDE

The present invention relates to the preparation of III-V materials.

III-V materials are materials, such as compounds or solid solutions containing such compounds, formed from an element belonging to Group III of the periodic table and an element belonging to Group V of the periodic table. In recent years a wide range of applications has been found for such materials in solid state electronic devices. Gallium arsenide is probably the most widely known and used III-V material, and consequently probably more attention has been paid to its preparation, ie production, than to the preparation of any other III-V material. However many applications and potential applications exist for other III-V materials, and consequently the preparations of such other materials are of current interest.

It is possible to prepare most of these other III-V materials by more than one known method for each material, although in most known cases one particular method has been preferred for use. However these preferred methods may have disadvantages. For instance, indium phosphide has most often been prepared by the direct reaction of phosphorus and indium metal at a temperature of about 1000°C. This reaction is slow and seldom complete. Also, it involves a high vapor pressure which consequently gives a considerable risk of explosion.

According to the present invention a method of preparing a III-V material which is or includes the phosphide of indium or gallium or the nitride of aluminium, indium or gallium includes directing a controlled gaseous flow of a hydride of phosphorus or nitrogen as appropriate into a vapour of a halide of aluminum, indium or gallium as appropriate and collecting the III-V material formed from the reaction between the said hydride and the said halide, the temperature of the said reaction being below the decomposition temperature of the III-V material.

The method is preferably carried out by heating the said halide in a vessel which allows a continuous reflux to occur and by introducing the said hydride into the vessel above the place in the vessel where the condensed liquid halide is collected.

Preferably the said hydride, if of phosphorus, is phosphine or, if of nitrogen, is ammonia.

Preferably the said halide is a chloride.

Preferably the temperature of the said reaction is at least 400°C.

Preferably the said hydride is mixed with an inert carrier gas and the rate of flow of the mixture of the said hydride and the carrier gas is about 50 cm$^3$ per minute.

In the prior art a method was reported which described the respective reactions of two group V hydrides, namely phosphine and arsine, with a group III halide, namely gallium dichloride and the reaction of phosphine with a second group III halide, namely indium monochloride. However in that method the hydrides were directed into the liquid, ie melt, of the halides. As a consequence the reaction products obtained were complexes which required further heat treatment to convert them into the appropriate III-V materials. In contrast, because the hydride in the method according to the invention is directed into the vapour of the halide the reaction product is the appropriate III-V material itself and not a complex requiring further heat treatment to obtain the III-V material.

Embodiments of the invention will now be described by way of example with reference to the accompanying drawing, which is a partly cross-sectional view of apparatus for preparing a III-V material by a method embodying the invention.

The apparatus illustrated incorporates a vertical silica glass reactor tube 1 fitted inside and extending below a connector housing 2 and an identical tube 3 fitted inside and extending below a connector housing 4. The connector housings 2 and 4 are preferably made of polytetrafluorethylene to facilitate cleaning. The tubes 1, 3 both contain at their respective bases identical charges 5, 7 of the appropriate halide of the appropriate group IIIb element. A vertical glass tube 9 having its lower end open is coaxial with the tube 1 and extends from a region inside the tube 1 directly above the charge 5 to the connector housing 2 in which it is fitted. Likewise, a vertical glass tube 13 having its lower end open is coaxial with the tube 3 and extends from a region inside the tube 3 directly above the charge 7 to the connector housing 4 in which it is fitted. Delivery tubes 18, 17 are connected to the tube 3 and to the tube 13 respectively inside the connector housing 4. The annular spaces between the tube 3 and the tube 13, the tube 18 and the tube 3 and the tube 17 and the tube 3 are all closed by the connector housing 4. The end of the delivery tube 17 remote from the connector housing 4 is connected to the tube 1 inside the connector housing 2. A delivery tube 15 is connected to the tube 9 also inside the connector housing 2. The annular spaces between the tube 17 and the tube 1, the tube 15 and the tube 19 and the tube 1 and the tube 9 are all closed by the connector housing 2.

Gases in the tube 17 in the region external to the tube 9 are allowed to be expelled into the delivery tube 1, and gases in the tube 3 in the region external to the tube 13 are allowed to be expelled into the delivery tube 18. The delivery tube 18 extends from the connector housing 4 into distilled water 19 contained in a bubbler tube 21 having a gas outlet port 23.

The delivery tube 15 has its end remote from the connector housing 2 dual gas inlet ports 25, 27. The appropriate group V hydride is admitted (when required) into the apparatus via the gas inlet port 25 and a suitable carrier gas can be admitted via the gas inlet port 27.

A calibrated flow-meter 33 is fitted in the delivery tube 15 and allows the rate of delivery of gas along the delivery tube 15 to be monitored accurately.

On/off valves 29, 31 are fitted respectively in the delivery tubes 17, 18, and on/off valves 35, 37 are fitted respectively in the gas inlet ports 25, 27. The valves 29, 31, 35 and 37 are used to prevent water vapour and air from entering the various parts of the apparatus when the arrangement consisting of the connector housing 2 and the tubes 1 and 9 is dismantled after use, as described below.

The tube 1 below the connector housing 2 is located inside a silica glass furnace 39 having an open upper end. Likewise, the tube 3 below the connector housing 4 is located inside a silica glass furnace 41 having an open upper end. A flat resistance heater spiral 43 is located on the inside wall of the furnace 39. A similar spiral 45 is located on the inside wall of the furnace 41. The spirals 43, 45 are each fed with electric current from a separate stablized supply (not shown). A semitransparent gold reflector shield 47 is positioned around the furnace 39, and a similar shield 49 is positioned around the furnace 41. These allow heat losses from the furnaces 39 and 41 to be reduced, while allowing the reaction proceeding in the furnace 39 and that, if any, proceeding in the furnace 41, to be viewed.

The arrangement consisting of the tubes 1 and 9, and furnace 39 and the spiral 43 is provided to produce pure III-V material. The arrangement consisting of the tubes 3 and 13, the furnace 41 and the spiral 45 is a control, ie protective, arrangement provided to remove any impurities which would otherwise be transferred back from the bubbler tube 21 to the reactor tube 1 and affect the purity of the chemical product in the first mentioned arrangement.

As an example, the preparation of indium phosphide (decomposition temperature: about 750°C) using the apparatus will now be described. The charges 5 and 7 are conveniently of indium monochloride in this case. The electric currents supplied to the spirals 43 and 45 are switched on and the temperatures inside the furnaces 41, 39 are allowed to rise. The valves 29, 31, 35 and 37 are opened, and the apparatus is flushed with dry hydrogen admitted via the gas inlet port 27. The flow of hydrogen is allowed to continue so that the hydrogen can be used as a carrier gas while the indium phosphide is being prepared. When the atmosphere inside each of the furnaces 39, 41 reaches a temperature of 600°C it is maintained at that temperature for about 15 minutes. After that period phosphine, which is itself normally already mixed with hydrogen, is admitted via the gas inlet port 25. The respective rates of admittance of phosphine into the gas inlet port 25 and of hydrogen into the gas inlet port 27 are adjusted by a conventional tap (not shown) until the combined rate of delivery of phosphine and hydrogen along the delivery tube 15 is in the range from 30 cm³ per minute to 70 cm³ per minute, but preferably 50 cm³ per minute, as measured by the flow-meter 33. The phosphine and hydrogen flow from the delivery tube 15 down the tube 9 where they meet the vapour of the indium monochloride from the charge 5. A chemical reaction occurs near the end of the tube 9 and polycrystalline indium phosphide 51 is produced as a result of this reaction. The indium phosphide 51 is deposited conveniently on the inside of the tube 9 provided that the tube 9 has been thoroughly cleaned and dried prior to its insertion in the apparatus.

Hydrogen chloride gas is produced as a result of the reactions:

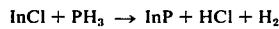

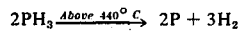

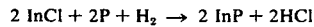

The hydrogen chloride gas escapes together with hydrogen into the delivery tube 17 and then flows successively into the tube 13, the tube 3, the delivery tube 18 and the bubbler tube 21. Some of the hydrogen is converted into hydrogen chloride by the indium monochloride in the tube 3.

The distilled water 19 in the bubbler tube 21 removes the hydrogen chloride and some of the hydrogen. The remaining hydrogen and any other waste gases are removed by a waste extractor unit (not shown) connected to the gas outlet port 23.

The tubes 1 and 3 allow a continuous reflux, ie continuous evaporation and condensation, of the indium monochloride to occur during the reaction. In this way the indium monochloride does not contaminate other parts of the apparatus and its loss is minimized.

It is possible to convert more than 95% of the indium monochloride in the tube 1 into indium phosphide. The indium phosphide 51 so produced is not contaminated with excess indium metal. Therefore the indium phosphide 51 requires no further chemical treatment. The reaction is relatively fast; more than 95% of 25 gm of indium monochloride can be converted into indium phosphide in about 24 hours. The reaction is relatively safe because the pressure used is atmospheric.

When the reaction has been completed the gas supplies are removed and the temperature inside the furnaces 39 and 41 is allowed to fall to room temperature. The valves 29, 31, and 35 and 37 are closed, and the arrangement consisting of the connector housing 2 and the tubes 1 and 9 is dismantled. The tube 9 is broken so that the indium phosphide 51 contained on it may easily be obtained. Because it is expended in this way the tube 9 is preferably made of inexpensive glass.

The tubes 1, 3 and 13 need only be replaced after about every twelve indium phosphide production runs; they can thus be made of relatively expensive pure silica to reduce impurity contamination. The charges 5 and 7 of indium monochloride can also be re-used over several production runs.

The pure indium phosphide obtained may be converted into single crystal material by a known technique such as Czochralski pulling, or it may be used in a known way to deposit epitaxial layers on suitable substrates by reheating.

The III-V compounds gallium phosphide and indium, gallium and aluminum nitride are all prepared at a temperature below their decomposition temperature in a similar way to that described above for indium phosphide, using a combined gas flow rate in the range from 30 cm³ per minute to 70 cm³ per minute, preferably 50 cm³ per minute. The following table lists appropriate starting reactants and the decomposition temperature (as quoted in the published literature) for each case.

|  | AlN | CaN | InN | GaP |
|---|---|---|---|---|
| Hydride | $NH_3$ | $NH_3$ | $NH_3$ | $PH_3$ |
| Halide | $AlCl_3$ | $GaCl_2$ | InCl | $GaCl_2$ |
| Decomposition Temperature | 1750°C | 1050°C | 620°C | 1000°C |

In the above examples, including that of indium phosphide, the substance $P_2H_4$ may be used instead of $PH_3$ and the substance $N_2H_4$ (hydrazine) may be used instead of $NH_3$; also, the bromide or iodide corresponding to the quoted chloride may alternatively be used instead of that chloride.

In the preparation of solid solutions containing at least one of the above compounds a mixture of the appropriate hydrides or a mixture of the appropriate halides or both may be used as a starting reactant, the composition of the mixture(s) being selected according to the composition of the required solid solution.

We claim:
1. A method of preparing indium phosphide by reacting together a hydride of phosphorus with a halide of indium comprising the steps of providing a reflux vessel for establishing a liquid-vapour reflux, said vessel hav- ing a receptacle for collection of solid material formed by chemical reaction in the vapour of said reflux, introducing a charge of said halide into said vessel, heating said vessel to provide a continuous reflux of said halide, the temperature of the vapor of said halide in said reflux being in the inclusive range of from 400° to 750°C, directing a controlled gaseous flow containing said hydride at a flow rate in the inclusive rate of between 30 and 70 cm$^3$ per minute into said halide vapour, and collecting the product of reaction between said halide vapour and said hydride on said receptacle.

2. The method of claim 1 wherein said vessel comprises an outer tube having a closed end for containing and collecting liquid halide during said reflux and an inner tube having an open end located above said liquid, said hydride being introduced downwardly via said inner tube, said open end of said inner tube constituting said receptacle.

3. The method of claim 2 wherein said outer tube has an outlet port leading to an inner tube of a further vessel identical with said first mentioned vessel, said further vessel providing a duplicate reaction identical with said first mentioned reaction to remove impurities capable of contaminating said first mentioned reaction.

4. The method of claim 1 wherein said reaction is carried out at a temperature of about 600°C.

5. The method of claim 1 wherein said hydride is mixed in an inert carrier gas, the rate of flow of the mixture of said hydride and said carrier gas into said vessel being in said inclusive range.

6. The method of claim 5 wherein said carrier gas is hydrogen.

7. The method of claim 1 wherein said hydride is phosphine.

8. The method of claim 2 wherein said hydride is phosphine.

9. The method of claim 1 wherein said halide is indium monochloride.

10. The method of claim 2 wherein said halide is indium monochloride.

* * * * *